United States Patent
Shao et al.

(10) Patent No.: US 8,102,835 B2
(45) Date of Patent: Jan. 24, 2012

(54) SYSTEM AND METHOD FOR WIRELESS COMMUNICATION OF UNCOMPRESSED VIDEO HAVING A BEACON LENGTH INDICATION

(75) Inventors: Huai-Rong Shao, Santa Clara, CA (US); Harkirat Singh, Santa Clara, CA (US); Xiangping Qin, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1105 days.

(21) Appl. No.: 11/936,495

(22) Filed: Nov. 7, 2007

(65) Prior Publication Data

US 2008/0129880 A1   Jun. 5, 2008

Related U.S. Application Data

(60) Provisional application No. 60/872,945, filed on Dec. 4, 2006.

(51) Int. Cl.
  *H04J 3/24* (2006.01)
  *H04L 12/28* (2006.01)
  *H04L 12/56* (2006.01)
(52) U.S. Cl. ........................ 370/349; 370/447
(58) Field of Classification Search .................. None
  See application file for complete search history.

(56) References Cited

U.S. PATENT DOCUMENTS

| | | | |
|---|---|---|---|
| 6,229,576 B1 | 5/2001 | Tarr et al. | |
| 6,879,567 B2 | 4/2005 | Callaway et al. | |
| 7,352,770 B1* | 4/2008 | Yonge et al. | 370/445 |
| 7,519,032 B2 | 4/2009 | Soomro et al. | |
| 7,564,812 B1 | 7/2009 | Elliott | |
| 7,796,555 B2* | 9/2010 | Jeon et al. | 370/331 |
| 7,864,701 B2 | 1/2011 | Matusz | |
| 7,987,499 B2 | 7/2011 | Ptasinski et al. | |
| 2004/0117497 A1* | 6/2004 | Park | 709/230 |
| 2005/0058153 A1* | 3/2005 | Santhoff et al. | 370/466 |
| 2005/0090264 A1 | 4/2005 | Kim | |
| 2005/0147075 A1* | 7/2005 | Terry | 370/338 |
| 2005/0226203 A1 | 10/2005 | Ho | |
| 2007/0177670 A1 | 8/2007 | Elnathan et al. | |
| 2007/0230338 A1 | 10/2007 | Shao et al. | |
| 2008/0129881 A1 | 6/2008 | Shao et al. | |
| 2009/0268697 A1* | 10/2009 | Jeon et al. | 370/336 |
| 2009/0323563 A1* | 12/2009 | Ho et al. | 370/280 |

OTHER PUBLICATIONS

High-Definition Multimedia (HDMI) Specifications version 1.2, Aug. 22, 2005.

(Continued)

*Primary Examiner* — Gregory Sefcheck
*Assistant Examiner* — Ashley Shivers
(74) *Attorney, Agent, or Firm* — Kenneth L. Sherman, Esq.; Michael Zarrabian, Esq.; Myers Andras Sherman & Zarrafabian LLP (57) ABSTRACT

A system and method for efficiently communicating messages over a low-rate channel between multiple devices in a system for wireless communication of uncompressed video is disclosed. A beacon length indication and processing method is provided to solve the problem of long beacon processing delay at the MAC layer of a receiving station.

25 Claims, 10 Drawing Sheets

OTHER PUBLICATIONS

IEEE Std 802.15.3, "Wireless Medium Access Control (MAC) and Physical Layer (PHY) Specifications for High Rate Wireless Personal Areas Networks (WPANs)", 2003.
WirelessHD Specification Version 1.0 Overview, Oct. 9, 2007.
http://www.neasia.nikeibp.com—printed on Sep. 29, 2006.
Nachman, Mark, "CE Giants Back Amimon's Wireless HDTV Tech" Article Date: Jul. 23, 2008 PCMAG.COM.
FreshNews.com, SiBEAM Receives Equity Investment from Best Buy, http://freshnews.com/print/node/261440, Jan. 4, 2010, 2 pages.
IEEE Wireless LAN Edition (2003), A compilation based on IEEE Std. 802.11TM-1999 (R 2003) and its Amendments, pp. 1-706.
International Search Report dated Jul. 15, 2008 in Application No. PCT/KR2008/001580, filed Mar. 21, 2008.
U.S. Non-Final Rejection for U.S. Appl. No. 11/936,600 mailed Nov. 29, 2010.
U.S. Final Office Action for U.S. Appl. No. 11/936,600 mailed May 9, 2011.
U.S. Non-Final Office Action for Application U.S. Appl. No. 11/936,600 mailed Sep. 28, 2011.

\* cited by examiner

SYSTEM AND METHOD FOR WIRELESS COMMUNICATION OF UNCOMPRESSED VIDEO HAVING A BEACON LENGTH INDICATION

CROSS-REFERENCE TO RELATED APPLICATIONS

This application claims the benefit under 35 U.S.C. 119(e) of U.S. Provisional Application No. 60/872,945, entitled "Beacon Design for Wireless Communication Systems", filed on Dec. 4, 2006, which is incorporated by reference in its entirety.

BACKGROUND OF THE INVENTION

1. Field of the Invention

The present invention relates to wireless transmission of video information, and in particular, to transmission of uncompressed high definition video information over wireless channels.

2. Description of the Related Technology

With the proliferation of high quality video, an increasing number of electronic devices, such as consumer electronic devices, utilize high definition (HD) video which can require multiple gigabit per second (Gbps) or more in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices that do not have the bandwidth to carry the uncompressed HD signals are connected to the network.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a system for wireless communication of uncompressed video, the system comprising a processor for generating a beacon length indication value representing the time length of a beacon frame, a memory in data communication with the processor to store the beacon length indication value, and a transmitter for wirelessly transmitting the beacon length indication value.

In another embodiment, there is a system for wireless communication of uncompressed video, the system comprising a receiver for wirelessly receiving a beacon length indication value representing the time length of a beacon frame, a memory to store the beacon length indication value, and a processor in data communication with the memory for initiating and completing a process for contending a current low rate physical layer (LRP) channel using the beacon length indication value.

In another embodiment, there is a method of processing of beacon frames in a system for wireless communication of uncompressed video, the method comprising generating a beacon length indication value representing the time length of a beacon frame, storing the beacon length indication value in a beacon frame, and wirelessly transmitting the beacon frame.

In another embodiment, there is a method of processing of beacon frames in a system for wireless communication of uncompressed video, the method comprising wirelessly receiving a beacon frame that includes a beacon length indication value representing the time length of a beacon frame by a receiving station, and initiating and completing a process for contending a current low rate physical layer (LRP) channel using the beacon length indication value by the receiving station.

In another embodiment, there is a computer-usable medium in a system for wireless communication of uncompressed video having computer readable code, the medium comprising instructions for processing and storing a beacon length indication value representing the time length of a beacon frame.

BRIEF DESCRIPTION OF THE DRAWINGS

FIG. 4b a diagram showing various fields of a long LRP header such as shown in FIG. 4a.

FIG. 5b a diagram showing various control bits in a beacon control field that may be used in a beacon frame such as illustrated in FIG. 5a.

DETAILED DESCRIPTION OF CERTAIN INVENTIVE EMBODIMENTS

Certain embodiments provide a method and system for transmission of uncompressed HD video information from a sender to a receiver over wireless channels.

The following detailed description is directed to certain sample embodiments of the invention. However, the invention can be embodied in a multitude of different ways as defined and covered by the claims. In this description, reference is made to the drawings wherein like parts are designated with like numerals throughout.

Embodiments include systems and methods of data processing in wireless communication devices for communication of uncompressed video data will be described. Video data may include one or more of motion video, still images, or any other suitable type of visual data. In particular, various embodiments representing novel beacon design for efficient formatting and processing of beacon frames for communication of uncompressed video data will be described.

Figure 1:
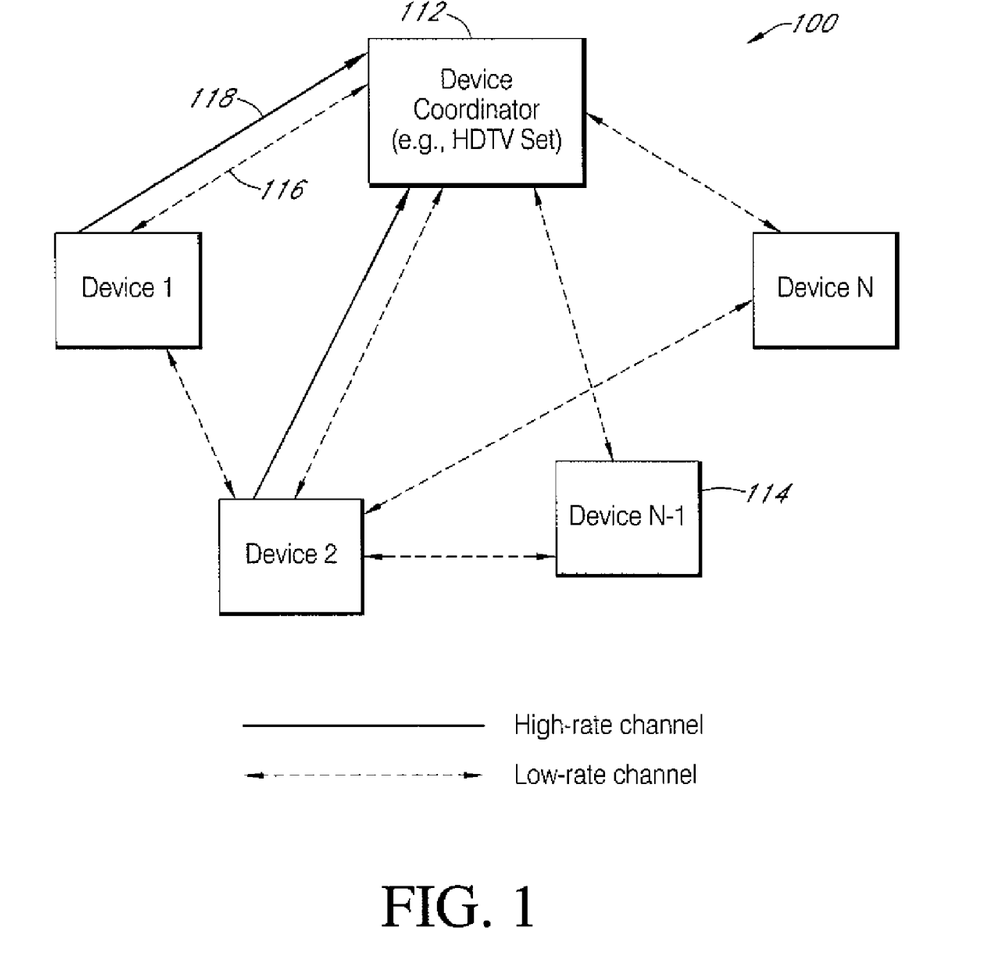
FIG. 1 is a functional block diagram of an exemplary configuration of a wireless network that implements uncompressed HD video transmission between wireless devices according to one embodiment of the system and method.

Exemplary implementations of the embodiments in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple client devices or A/V stations 114 (e.g., Device 1 . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (referred to as "receiver 112"), and the station 114 is a sender of the video information (referred to as "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, a digital camera, a camcorder, and so forth.

Figure 2:
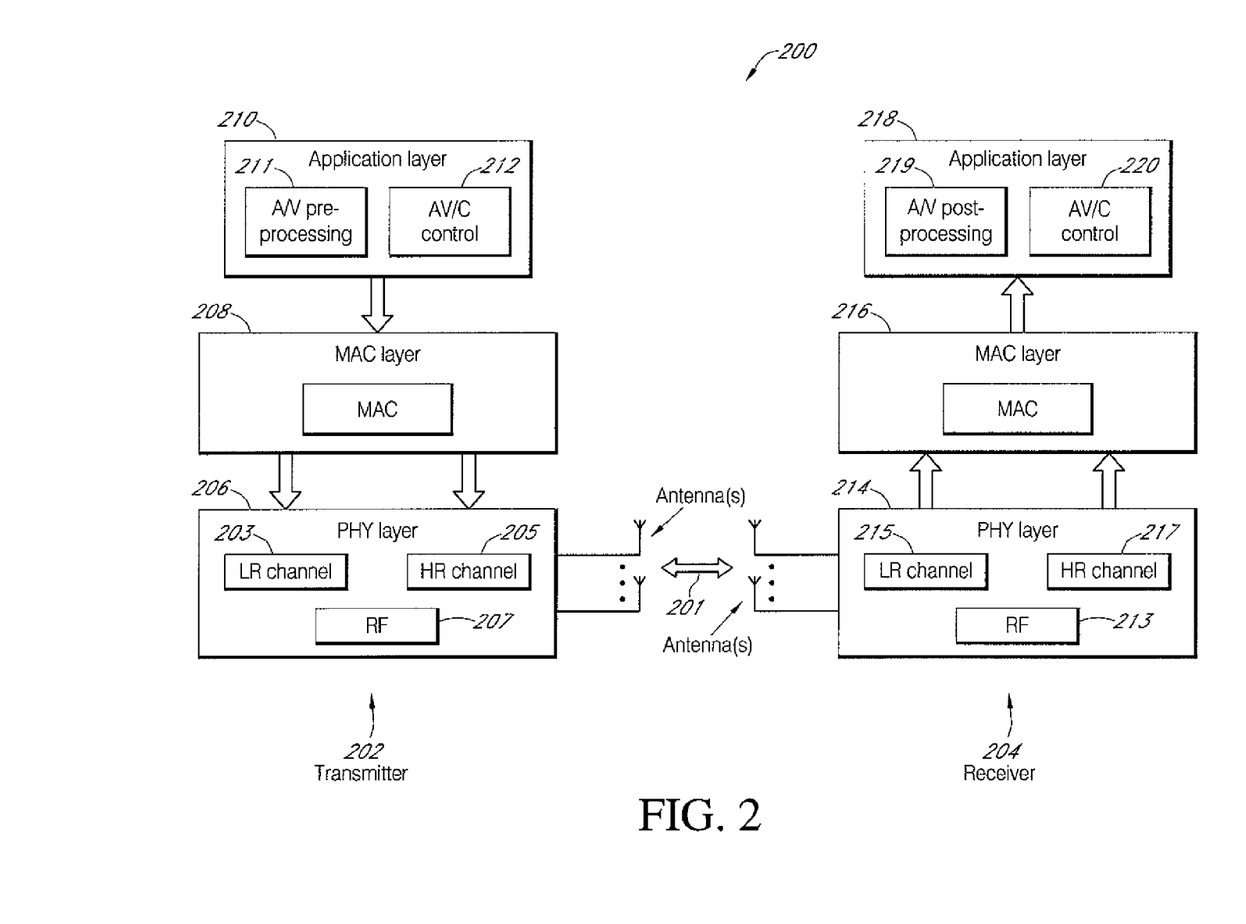
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
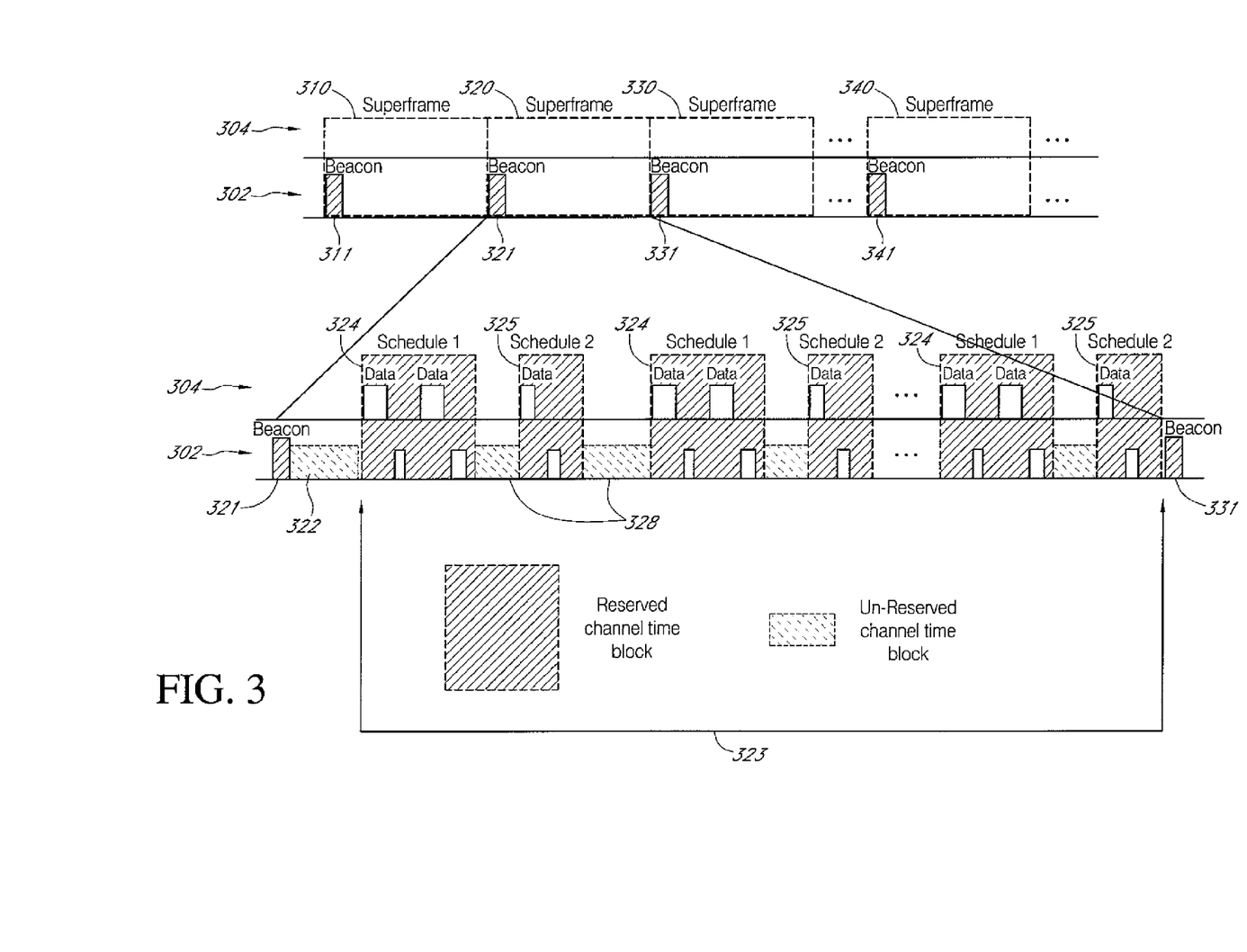
FIG. 3 is a diagram of a sequence of superframes and various sub elements of a superframe and schedule information elements that can be used in a wireless network such as illustrated in FIG. 1.

FIG. 3 illustrates a sequence of superframes and a decomposition of an example of a superframe time period that may be used in a wireless network such as illustrated in FIG. 1 according to one embodiment. Many time division duplexing (TDD) channel access control schemes known to those in the art can be used to coordinate transmissions of the low-rate and high-rate channels within a network. The goal of the TDD scheme is to only have one of the two channels, low-rate or high-rate, being used for transmission at any one time. An example of a channel access control scheme used to coordinate the low-rate and high-rate channels is a superframe-based scheme. FIG. 3 is an illustration of a sequence of superframes that may be used in a wireless network such as illustrated in FIG. 1. In a superframe base transmission system, the transmission time is divided into a series of superframes 310, 320, 330, 340. The length of time of the superframe is made small enough to allow for frequent medium access control (this cuts down on delays in processing control signals that enable access), but is made long enough to provide for efficient throughput of uncompressed video data. Large delays in processing user commands, such as on/off, channel switch, volume change, etc., will negatively affect the user experience. For these reasons, a superframe time is typically in a range from about 16 msec. to about 100 msec., but can vary from this range in other embodiments.

In the example superframe scheme shown in the lower portion of FIG. 3, a representative superframe 320 is divided into three main time frames, a beacon frame 321, a control period frame 322 and a frame for reserved and unreserved channel time blocks (CTBs) 323. The time frame 323 for reserved and unreserved CTBs is herein referred to as the CTB frame 323.

The lower portion of FIG. 3 illustrates a time division duplexing of the low rate channel (LRC) 302 and high rate channel (HRC) 304 within a superframe period according to one embodiment. In certain embodiments, only the LRC 302 is used for transmission during the beacon frame 321, and the control period frame 322. Both the high-rate and low-rate channels can be used for transmission during the CTB frame 323. Any of the beacon frame 321, the control frame 322 and the CTB frame 323 can have either fixed or variable durations, depending on the embodiment. Likewise, the superframe time duration can be fixed or variable, depending on the embodiment.

The control period frame 322 is used to allow client devices to transmit control messages to a device coordinator. Control messages may include network/device association and disassociation, device discovery, time slot reservations, device capability and preference exchanges, etc. The control period frame 322 may use a contention based access system such as Aloha, slotted Aloha, CSMA (carrier sensed multiple access), etc., to allow multiple devices to send control messages and to handle collisions of messages from multiple devices. When a message from a client device is received at a device coordinator without suffering a collision, the device coordinator can respond to the request of the message in the beacon frame 321 of a subsequent superframe 330 or in a separate control message. The response may be a time slot reservation of a CTB in one or more subsequent superframes, such as superframes 330 or 340.

The CTB frame 323 is used for all other transmissions other than beacon messages and contention based control messages which are transmitted in the beacon frame 321 and the control frame 322. A CTB frame can include any number of reserved or unreserved CTBs. Each CTB may have single or multiple data frames. Reserved CTBs 324, 325 are used to transmit commands, isochronous streams and asynchronous data connections. CTBs can be reserved for transmission by a coordinator device to a specific client device, for transmission by a client device to a device coordinator, for transmission by a client device to another client device, etc. In one embodiment as shown in FIG. 3, a schedule concept is introduced to organize reserved CTBs. In each superframe, one schedule can have only one reserved CTB (for example, for pre-scheduled beam searching or bandwidth reservation signaling) or can have multiple periodical reserved CTBs (for example, for an isochronous stream). Unreserved CTBs 328 in the CTB frame 323 are usually used for communication of further contention based commands such as remote control commands and MAC control and management commands on the low-rate channel 304. In certain embodiments, no beamforming transmission is allowed within unreserved CTBs.

I. Beacon Design

A beacon frame is used for multiple purposes. One purpose is to set the timing allocations for the reserved and unreserved CTBs of the CTB frame 323. A device coordinator 112, such as a television set, for example, communicates reserved time slots to the multiple client devices 114 in a network, such as the network 100 in FIG. 1. The beacon frames 311, 321, 331, 341 are transmitted periodically to identify the start of the superframes 310, 320, 330, 340. In certain embodiments, a configuration of the superframe and other parameters is carried in the beacon frame. For example, the beacon frame 321 may carry the timing information of different schedules associated with the reserved CTBs 324, 325.

Figure 4A:
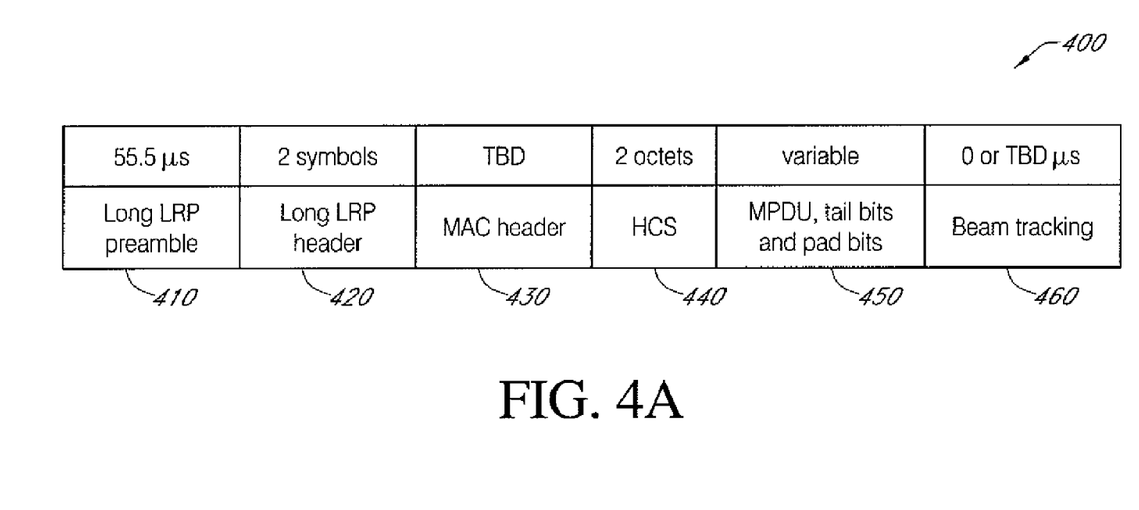
FIG. 4a is a diagram showing various fields of a long LRPPDU packet such as a beacon frame as shown in FIG. 3.
Figure 4B:
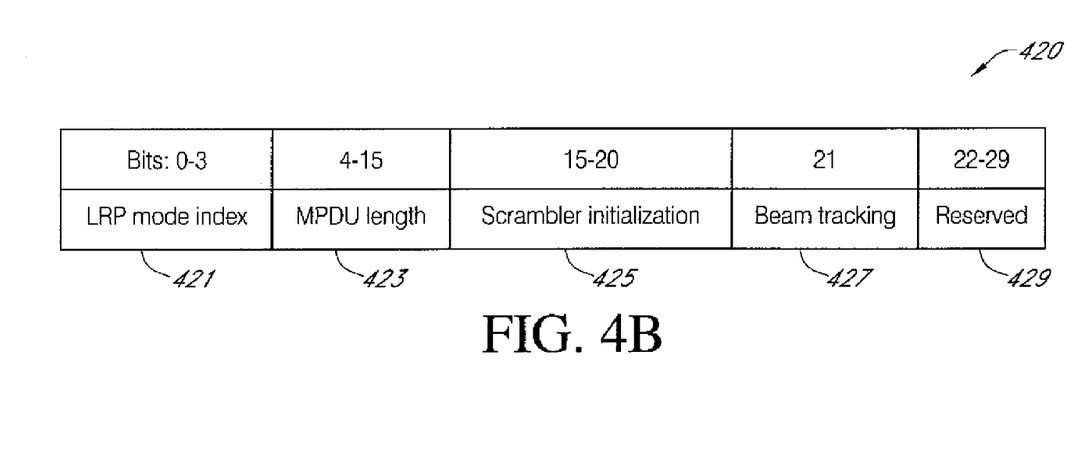

In one embodiment, the beacon frame 321 uses a long low rate physical layer protocol data unit (LRPPDU) format 400 such as shown in FIG. 4a. In particular, the beacon frame uses a long low-rate physical layer (LRP) preamble 410 and is sent in the default LRP mode. The long LRP preamble 410 is followed by a long LRP header 420. The long LRP header 420 is followed by a MAC header 430. The MAC header 430 is followed by a header check sequence (HCS) field 440. The HCS field 440 is followed by a medium access control protocol data unit (MPDU) field 450. The MPDU field 450 is followed by a beam tracking field 460. As shown in FIG. 4b, the long LRP header 420 includes a LRP mode index field 421, a MPDU length field 423, a scrambler initialization field 425, a beam tracking field 427, and a reserved field 429. The long LRP header 420 and the MPDU length field 423, in particular, will be discussed below in reference to the beacon length indication in Section III.

a. Beacon Frame Format

Figure 5A:
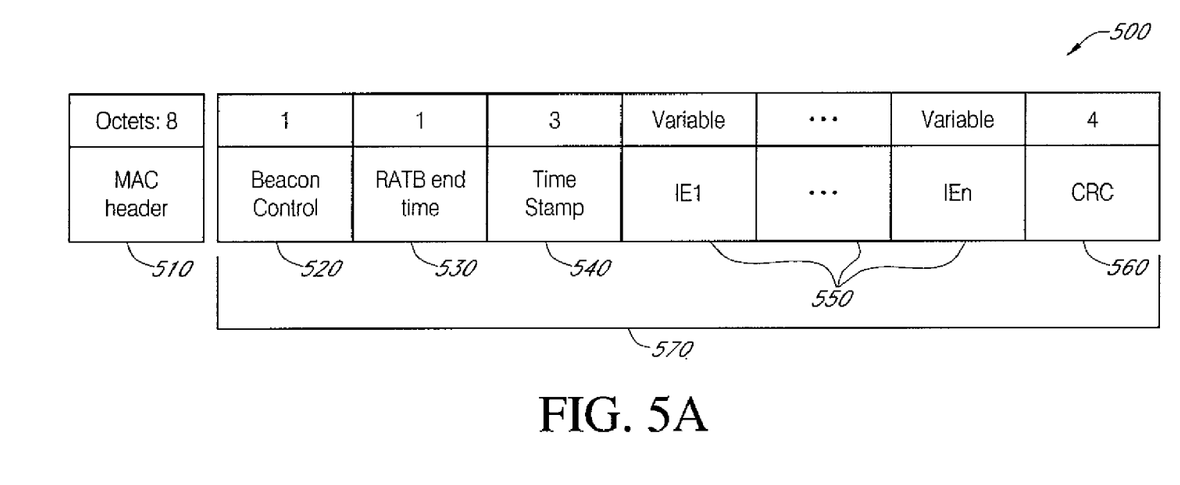
FIG. 5a a diagram showing various fields in a beacon frame that may be used in a superframe structure such as illustrated in FIG. 3.

FIG. 5a shows various fields in a beacon frame 500 that may be used in a superframe 320 such as illustrated in FIG. 3 according to one embodiment. In certain embodiments, the beacon frame 500 includes a MAC header 510 and MAC payload information 570. The MAC payload information refers to all fields that come after the MAC header 510. In certain embodiments, the MAC payload information includes a Beacon Control field 520, a Random Access Time Block (RATB) field 530, a TimeStamp field 540, and one or more information elements (IEs) 550 and a Cyclic Redundancy Check (CRC) field 560. The value for the CRC field 560 is calculated over all the IEs in the beacon frame. The RATB End Time 530 field indicates the end time of the contention-based control period (RATB). It is defined as the time offset from the starting time position of the beacon in units of 4 microseconds, in one embodiment. The RATB is a special unreserved CTB which is immediately after the beacon frame in each superframe. The RATB is used for devices to send urgent control/management commands through contention. The TimeStamp field 540 carries the actual starting transmission time of the current beacon frame and will be discussed in detail below in reference to FIGS. 7 and 8. The Beacon Control field 520 contains various control bits configured for reducing size and processing time of beacon frame and will be discussed in detail below in reference to FIG. 5b. For the purpose of this discussion, information elements 550 may be classified as schedule information elements and non-schedule information elements. The information elements (IEs) 550 are organized with the reserved schedule IEs first. The schedule information elements are information elements that describe the properties of the reserved CTBs in the CTB frame 323. In certain embodiments, there are two kinds of schedule IEs: static schedule IES and dynamic schedule IEs. Static schedule IEs may contain the persistent schedule timing information for A/V streams which usually last a long time. Dynamic schedule IEs contain the schedule timing information for on-the-fly reservation for temporary transmission such as beam-searching, control message exchanging, and the like.

In some embodiments, one or more of the fields 510, 520, 530, 540, 550 of the beacon frame 500 of FIG. 5 may be rearranged and/or combined. In yet other embodiments, the beacon frame 500 may not include one or more of the fields shown in FIG. 5. In yet other embodiments, the beacon frame may include one or more fields in addition to the fields shown in FIG. 5a.

b. Beacon Control Field

Figure 5B:
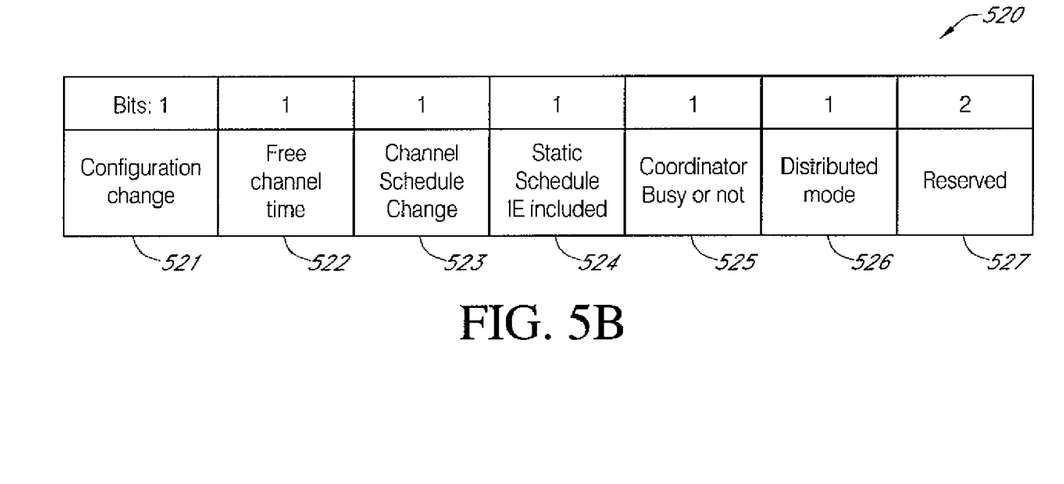

As discussed above in reference to FIG. 5a, in one embodiment, the beacon frame 500 includes the beacon control field 520. FIG. 5b shows various control bits in the beacon control field 520 that may be used in a beacon frame such as illustrated in FIG. 5a according to one embodiment. In certain embodiments, the beacon control field 520 includes a Configuration Change bit 521, a Free Channel Time bit 522, a Channel Schedule Change bit 523, a Static Schedule IE Included bit 524, a Coordinator Busy or Not bit 525, a Distributed Mode bit 526, and a Reserved bit 527.

In a beacon frame, the Configuration Change bit 521 is configured to indicate whether there is a change in the MAC payload information 570 in the current beacon frame as compared to the previous beacon frame except for the change in the TimeStamp field 540. Therefore, a change that the control bit indicates not only includes a change in a schedule IE, but also other changes such as a change in the length of the superframe. If there is no change, the Configuration Change bit 521 is set to "0" (zero). A station receiving this beacon frame only needs to parse the TimeStamp field and needs not parse any of the information elements (IEs) in the beacon frame, thereby achieving a reduction in beacon processing time. In an alternative embodiment, when the Configuration Change bit 521 is zero, the transmitted beacon frame may not even contain the unchanged information elements, thereby achieving a reduction in the beacon frame size as well as the reduction in beacon processing time.

The Free Channel Time bit 522 is configured to indicate whether there is still channel time available to accept a new-bandwidth reservation request or allow devices to contend the channel at unreserved CTB(s). In certain embodiments, the Free Channel Time bit 522 is set to "0" (zero) if the coordinator decides not to allow any new reservations or allow devices to contend the channel at unreserved CTB(s). Otherwise, the Free Channel Time bit is set to "1".

The Channel Schedule Change bit 523 is configured to indicate whether there is a channel time scheduling change in the current superframe compared to the previous superframe. For example, a channel time scheduling change occurs when a new schedule IE is added or a pre-existing schedule IE is deleted; when the timing information in one schedule IE is changed; or when the channel time block duration is enlarged or shortened. If there is no change, the Channel Schedule Change bit 523 is set to "0" and a station receiving this beacon frame does not need to parse schedule IEs in the beacon frame, thereby achieving a reduction in beacon processing time. In an alternative embodiment, when the Channel Schedule Change bit 530 is zero, the transmitted beacon frame may not even contain the unchanged schedule information elements, thereby achieving a reduction in the beacon frame size as well as the reduction in beacon processing time.

The Static Schedule IE Included bit 524 is configured to indicate whether static schedule IEs for persistent A/V streams are included in the current beacon. To reduce beacon overhead, including the size and processing time, static schedule IEs don't need to be included in every beacon frame. Instead, static schedule IEs may be included in beacon frames periodically with an interval longer than superframe duration. If no static schedule IE is included in the current beacon frame, the Static Schedule IE Included bit 524 is set to "0" (zero) and a station receiving this beacon frame needs not parse the static schedule IES in the beacon frame, thereby achieving a reduction in beacon processing time.

The Coordinator Busy or Not bit 525 is configured to indicate whether the coordinator is busy or not on handoff procedure. The Distributed Mode bit 526 is configured to indicate whether the coordinator is busy or not on handoff procedure.

Figure 6:
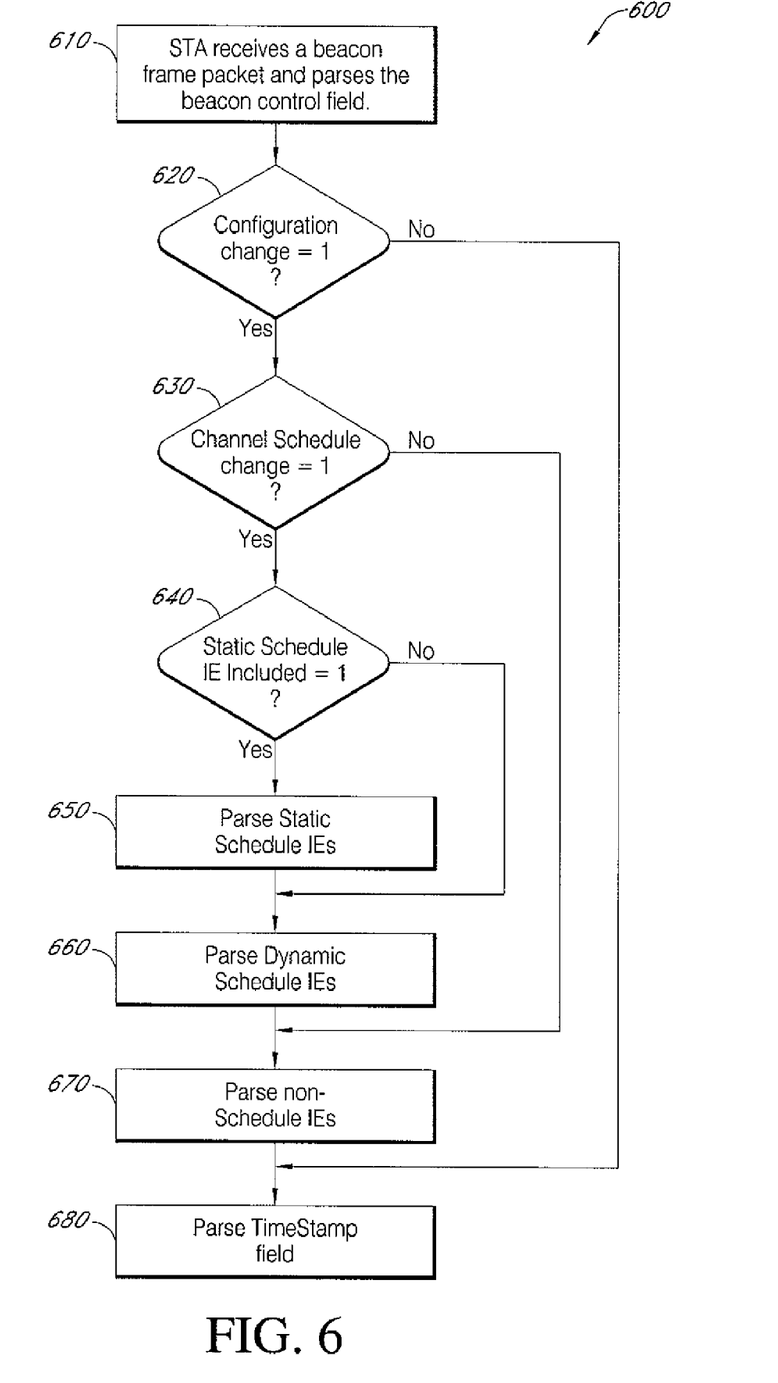
FIG. 6 is a flowchart of an embodiment of the use of various control bits in a beacon control field such as shown in FIG. 5b.

FIG. 6 is a flowchart illustrating an example process 600 for the processing of various control bits in a beacon control field such as shown in FIG. 5b. The process 600 starts at state 610, where a station (STA) receives a beacon control frame packet and parses the beacon control field to obtain various control bits including the Configuration Change bit 521, the Channel Schedule Change bit 523, and the Static Schedule IE Included bit 524 as discussed above in reference to FIG. 5b. After the receiving station parses the control bits, the process moves to a decision state 620 where the value of the Configuration Change bit 521 is tested. If the value is "0," or such as indicating there was no change, the process proceeds to state 680 to parse only the TimeStamp field 540 in the beacon frame 500 as shown in FIG. 5b. On the other hand, if the value is "1," or such as indicating there was a change, the process moves to a decision state 630, where the value of Channel Schedule Change bit 523 is tested. If the value is "0," or such as indicating there was no change, the process proceeds to state 670 where only non-schedule IEs among the received IEs are parsed, followed by the parsing of TimeStamp field (state 680) discussed above. On the other hand, if the value is "1," or such as indicating that there was a change, the process moves to a decision state 640 where the value of the Static Schedule IE Included bit is tested. If the value is "0," or such as indicating there was no change, the process proceeds to state 660 where only dynamic schedule IEs among the received schedule IEs are parsed followed by the parsing of non-schedule IEs (state 670) and the parsing of TimeStamp field (state 680) discussed above. On the other hand, if the value is "1," or such as indicating that a static schedule IE is included, the process 600 moves to state 650 where the static schedule IEs are parsed, followed by the parsing of dynamic schedule IEs (state 660), the parsing of non-schedule IEs (state 670), and the parsing of TimeStamp field (state 680) as discussed above.

Thus the process 600 provides an efficient method for a receiving station to process a beacon frame. The inclusion of the Configuration Change bit 521 eliminates the need to parse any of the information elements (IEs) when the current beacon frame contains no new IE as compared to the previous superframe. Likewise, the inclusion of the Channel Schedule Change bit 523 eliminates the need to parse any of the schedule IEs when the current beacon frame includes no new schedule IE as compared to the previous superframe. Also likewise, the inclusion of the Static Schedule IE Included bit 524 eliminates the need to parse any of the static schedule IEs when the current beacon frame contains no static schedule IEs. Thus, the use of various control bits described in process 600 improves the system efficiency by reducing the beacon processing time. Also in some embodiments, the use of the control bits reduces the size of the beacon frame itself as some of the unchanged IEs may not be included in the beacon frame in the first place.

The above-described method of processing a beacon frame may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission.) In some embodiments, the receiver 112 or the sender 114 shown in FIG. 1 includes the computer readable recording medium and can also include a processor, controller, or other computing device.

II. Time Stamp and Inter-Station Time Synchronization

Figure 7:
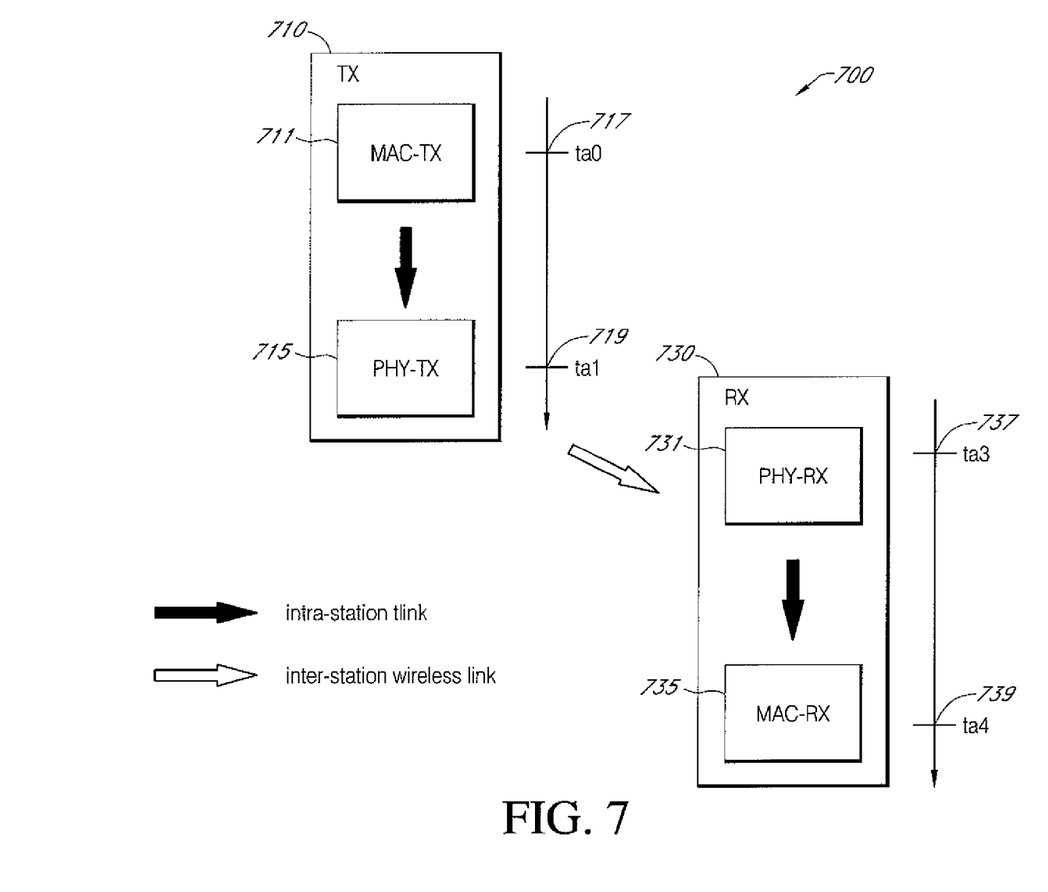
FIG. 7 is a diagram showing a method of time synchronization between a transmitting station and a receiving station that can be used in a wireless network such as illustrated in FIG. 1.

As discussed above in reference to FIG. 5a, the beacon frame 500 includes the TimeStamp field 540. The TimeStamp field 540 carries the actual starting transmission time of the current beacon frame that is used for inter-station time synchronization. FIG. 7 is an illustration of a method of time synchronization between a transmitting station and a receiving station. The inter-station synchronization system 700 is designed to achieve a synchronization of time between a transmitting station (TX) 710 and a receiving station (RX) 730. The transmitting station (TX) 710 may be a device coordinator 112 (FIG. 1) or a device or a station that is capable of transmitting a beacon frame to a coordinator or to another station. The transmission station (TX) 710 includes a medium access control layer (MAC-TX) 711 and a physical layer (PHY-TX) 715. The receiving station (RX) 730 likewise includes a medium access control layer (MAC-RX) 735 and a physical layer (PHY-RX) 731.

In certain embodiments, the PHY-TX 715 sets an accurate timer for strictly periodical beacon transmissions. Therefore, at time=$t_{a0}$ 717, the MAC-TX 711 knows the exact transmission time ($t_{a1}$) of the next beacon frame by the PHY-TX 715 and sets the value of the TimeStamp field 540 (FIG. 5a) to the next transmission time $t_{a1}$ 719. The MAC-TX layer 711 sends the beacon frame with the TimeStamp field set to $t_{a1}$ 719 to the PHY-TX 715. At $t_{a1}$ 719, the time specified in the TimeStamp field, the PHY-TX 715 wirelessly transmits the beacon frame. The PHY-RX 731 of the receiving station (RX) 730 receives the beacon frame and records the reception time, $t_{a3}$ 737, which represents the local time at which the PHY-RX 731 actually received the beacon frame. The PHY-RX layer 731 sends the beacon frame having the TimeStamp field 540 along with the newly recorded reception time, $t_{a3}$ 737, to the MAC-RX 735. The MAC-RX 735 layer at $t_{a4}$ 739 adjusts the RX's internal clock by a difference between the TimeStamp value ($t_{a1}$) and the recorded reception time ($t_{a3}$) in embodiments where the RX clock adjustment is done at the MAC layer.

Figure 8:
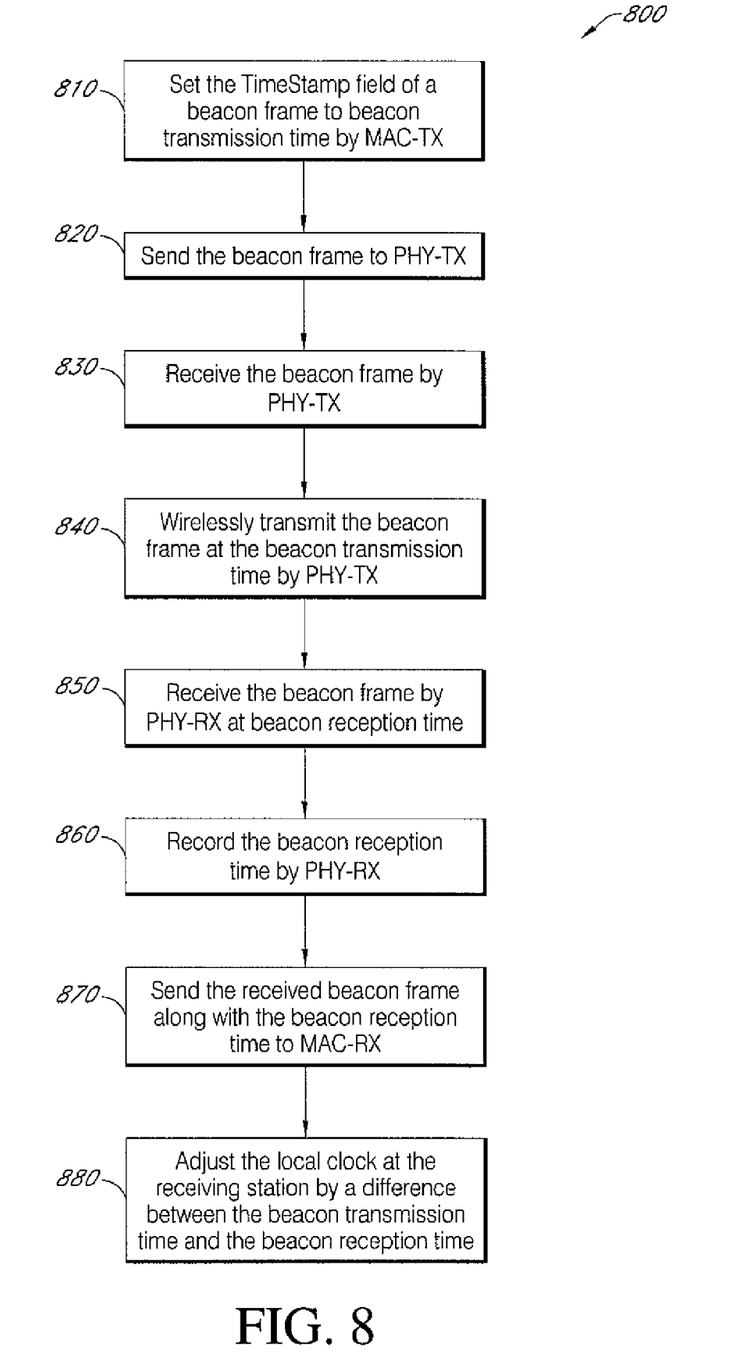
FIG. 8 is a flowchart of an embodiment of a method of time synchronization such as illustrated in FIG. 7.

FIG. 8 is a flowchart illustrating an example time synchronization process 800 corresponding to the time synchronization such as illustrated in FIG. 7. The time synchronization process 800 starts at state 810, where the MAC-TX 711 sets the TimeStamp field of a beacon frame to the transmission time of the next beacon frame by the PHY-TX 715 (as measured with the transmission station clock), hereafter referred to as the "beacon transmission time," which corresponds to $t_{a1}$ 719 shown in FIG. 7. The MAC-TX sends (state 820) and the PHY-TX receives (state 830) the beacon frame with the beacon transmission time in the TimeStamp field. At state 840, the PHY-TX 715 wirelessly transmits the beacon frame at the beacon transmission time. At state 850, the PHY-RX 731 receives the beacon frame. Upon receiving the beacon frame, the PHY-RX, at state 860, records the time of the reception (as measured with the receiving station clock), hereafter referred to as the "beacon reception time", which corresponds to $t_{a3}$ 737 shown in FIG. 7. Subsequent to the recording of the beacon reception time, the PHY-RX, at state 870, sends the received beacon frame along with the beacon reception time to the MAC-RX. After receiving the beacon frame and parsing the TimeStamp field, the MAC-RX, at state 880, adjusts the local clock at the receiving station by a difference between the beacon transmission time and the beacon reception time, thereby synchronizing time between the transmitting station 710 and the receiving station 730.

The above-described method of time synchronization may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission.) In some embodiments, the receiver 112 or the sender 114 shown in FIG. 1 includes the computer readable recording medium and can also include a processor, controller, or other computing device.

III. Beacon Length Indication

Figure 9:
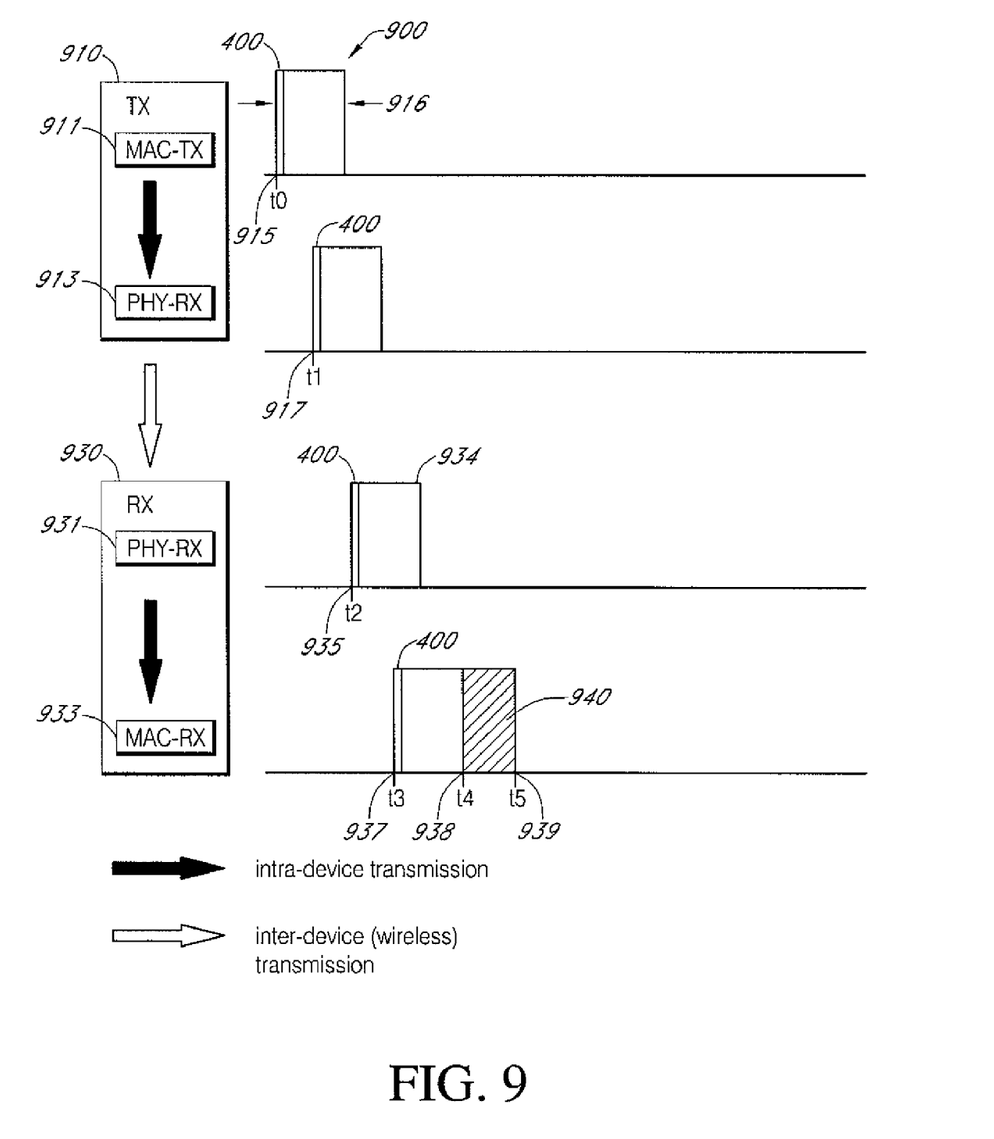
FIG. 9 is a diagram illustrating a method of beacon length indication for solving the long beacon processing delay at the MAC layer of a receiving station.

FIG. 9 is a timing and block diagram illustrating a method of beacon length indication for solving a problem of a long beacon processing delay at the MAC layer of a receiving station. The system includes a transmitting station 910 and a receiving station 930. The transmitting station 910 includes a MAC layer (MAC-TX) 911 and a PHY layer (PHY-TX) 913. The receiving station 930 includes a MAC layer (MAC-RX) 931 and a PHY layer (PHY-RX) 933. At t=t0 915, the MAC-TX 911 starts to create a new beacon frame 900, similar to beacon frame 500 (FIG. 5). The new beacon frame 900 includes a PHY header called a long LRPPDU packet 400. As discussed above in reference to FIG. 4a, the long LRPPDU packet 400 includes the long LRP header field 420. Also as discussed in reference to FIG. 4b, the long LRP header field includes the MPDU length subfield 423. The beacon frame packet 900 has a time duration of Δt 916. The MAC-TX sends the beacon frame to the PHY-RX to be transmitted at a specified beacon transmission time (t=t1) 917. The PHY-RX 931 of the receiving station 930 starts to receive the beacon frame at t=t2 935 and sends the beacon frame to the MAC-RX 933. The MAC-RX 933 starts receiving the beacon frame at t=t3 937 beginning with the long LRP header 420 and ends receiving the beacon frame at a beacon received time (t=t4) 938.

As discussed above in reference to FIGS. 5a and 5b, the fields of information coming after the MAC header 510 (FIG. 5) are referred to the MAC payload information 570. For example, the MAC payload information 570 comprises all IEs 550 as shown in FIG. 5 including any schedule IEs. The MAC payload information 570 in the beacon frame is used to indicate the channel schedule and other information for the current superframe. However, since the beacon frame is processed at a MAC layer of a receiving station (MAC-RX) 933, there may be a long delay up to 100 microseconds after the beacon frame packet is received by the MAC-RX at the beacon received time (t=t4) 938, in certain embodiments. This is because the MAC-RX 933 does not know a priori the length of the beacon frame it is processing and, therefore, cannot contend (find free time on) the current LRP channel for transmission until the entire beacon frame is received at the beacon received time 938. Therefore, the beacon processing extends beyond the beacon received time t4 938 to t5 939. This post-reception contention process results in a dead processing time 940.

To eliminate the dead processing time problem, in certain embodiments, a LRP payload indication primitive—PHY_LRP_Payload_length.indication( )—is introduced to carry a beacon length indication value from the PHY-RX 931 to the MAC-RX 933 a beacon length indication value. The beacon length indication value corresponds to the length of the currently received LRP packet The PHY-RX 931 obtains the beacon length indication value by parsing the MPDU length_subfield 423 of the LONG LRP header 420 received from the transmitting station 910. Under this scheme, the MAC-RX 933 receives the beacon length indication prior to the beacon processing completion time 939 and can immediately contend the current LRP channel at the RATB without waiting for the beacon process completion at the MAC-RX 933.

Figure 10:
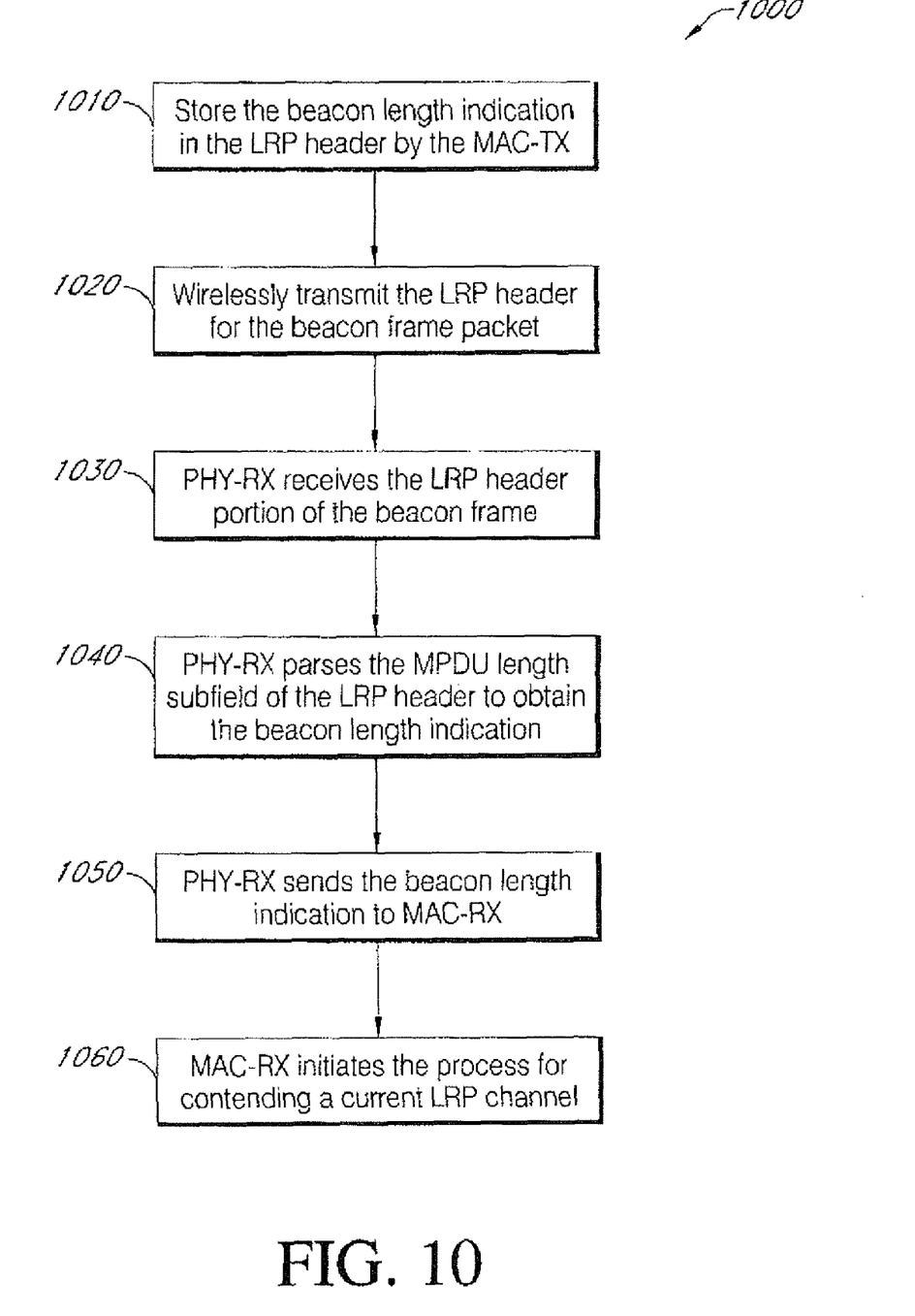
FIG. 10 is a flowchart of an embodiment of a method of solving the long beacon processing delay such as illustrated in FIG. 9.

FIG. 10 is a flowchart illustrating an example process 1000 for processing the beacon length indication such as illustrated in FIG. 9. The process 1000 starts at state 1010, where the MAC-TX, while assembling a new beacon frame 900, stores a beacon length indication value in the MRDU length subfield 423 of the long LRP header 420. As discussed above, the long LRP header 420 is a field of the long LRPPDU packet 400 shown in FIG. 9. At state 1020, the PHY-TX 1113 starts to wirelessly transmit the beacon frame packet 900 beginning with the long LRPPDU packet 400. At state 1030, the PHY-RX 931 receives the long LRPPDU packet 400 of the beacon frame. At state 1040, the PHY-RX 931 parses the long LRP header 420 portion of the long LRPPDU packet 400 to obtain the beacon length indication value stored in the MRDU length subfield 423 of the long LRP header 420. At state 1050, the PHY-RX 931 sends the beacon length indication value to the MAC-RX 933. At state 1060, after receiving the beacon length indication, the MAC-RX 1131 initiates the process for contending a current LRP channel immediately without waiting for the reception of the entire beacon frame, thereby eliminating the dead processing time 940.

Thus the process 1000 provides an efficient method for a MAC-RX 933 to process a beacon frame. The reception of the beacon length indication allows the MAC-RX 933 to initiate a contention process for a current LRP channel without waiting for the reception of the entire length of the current beacon frame. This, in turn, eliminates the unnecessary dead processing time 940 that would have been associated with the post-completion contention for a current LRP channel.

If a receiving station (RX) cannot receive the LRP header 420 of a beacon frame correctly, then the RX cannot parse the LRP header to obtain the beacon length indication to know when the RATB will start. To solve this problem, one embodiment of this invention includes maxBeaconLen and minRATBLen constant parameters. If the RX does not receive the beacon frame within maxBeaconLen time from the nominal beacon starting time, it can send out a CTB information request packet to the coordinator within minRATBLen time.

As an alternative method to solve the long beacon processing delay at the MAC-RX, each beacon frame is configured to carry control and management information for the next superframe instead of the current superframe. Under this alternative method, the MAC-RX would know the length of the present beacon frame from the information received in the previous superframe.

The above-described method of beacon length indication may be realized in a program format to be stored on a computer readable recording medium that includes any kinds of recording devices for storing computer readable data, for example, a CD-ROM, a DVD, a magnetic tape, a memory or cache (e.g., capable of storing firmware), memory card and a disk, and may also be realized in a carrier wave format (e.g., Internet transmission or Bluetooth transmission.) In some embodiments, the receiver 112 or the sender 114 shown in FIG. 1 includes the computer readable recording medium and can also include a processor, controller, or other computing device.

CONCLUSION

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A system for wireless communication of uncompressed video comprising:
 a processor for generating a beacon length indication value representing the time length of a beacon frame;
 a memory in communication with the processor to store the beacon length indication value; and
 a transmitter for wirelessly transmitting the beacon length indication value, wherein the beacon length indication value is added to a medium access control protocol data unit (MPDU) length subfield of a long low-rate physical layer (LRP) header, wherein the beacon length indication value is placed in an LRP payload indication primitive, wherein the LRP payload indication primitive is obtained before a corresponding beacon frame such that a receiver may receive the LRP payload indication primitive prior to the entire beacon frame and wherein the process for contending the current LRP channel is completed before the completion of processing of the beacon frame by a receiving station.

2. The system of claim 1, wherein the beacon length indication value represents the time length of the beacon frame belonging to a current superframe.

3. The system of claim 1, wherein the beacon length indication value represents the time length of the beacon frame belonging to a next superframe.

4. The system of claim 3, wherein each beacon frame includes control and management information for the next superframe instead of a current superframe.

5. The system of claim 1, wherein the beacon length indication value is stored in the beacon frame.

6. The system of claim 5, wherein the payload indication primitive, PHY_LRP_Payload_length.indication( ), is transmitted from a physical layer (PHY) receiving station (PHY-RX) to a medium access control (MAC) layer receiving station (MAC-RX).

7. The system of claim 6, wherein the PHY-RX obtains the beacon length indication value by parsing the MPDU length sub-field of the long LRP header received from a transmitting station.

8. The system of claim 7, wherein the MAC-RX receives the beacon length indication prior to beacon processing completion time to immediately contend a current LRP channel at a contention based control period without waiting for beacon process completion at the MAC-RX.

9. The system of claim 7, wherein processing delay is reduced by receiving the beacon length indication prior to beacon processing completion time.

10. A system for wireless communication of uncompressed video comprising:
 a receiver for wirelessly receiving a beacon length indication value representing the time length of a beacon frame, wherein the beacon length indication value is added to a medium access control protocol data unit (MPDU) length subfield of a long low-rate physical layer (LRP) header, wherein the beacon length indication value is placed in an LRP payload indication primitive;
 a first memory to store the beacon length indication value; and
 a processor in data communication with the first memory for initiating and completing a process for contending a current LRP channel using the beacon length indication value before the completion of processing of the beacon frame by a receiving station, wherein the LRP payload indication primitive is received before a corresponding beacon frame such that the receiver receives the LRP payload indication primitive prior to the entire beacon frame.

11. The system of claim 10, wherein the beacon length indication value represents the time length of the beacon frame belonging to a current superframe.

12. The system of claim 10, wherein the beacon length indication value represents the time length of the beacon frame belonging to a next superframe.

13. A method of processing of beacon frames in a system for wireless communication of uncompressed video, the method comprising:
generating a beacon length indication value representing the time length of a beacon frame;
storing the beacon length indication value in a beacon frame by adding the beacon length indication value to a medium access control protocol data unit (MPDU) length subfield of a long low-rate physical layer (LRP) header, wherein the beacon length indication value is placed in an LRP payload indication primitive; and
wirelessly transmitting the beacon frame, wherein the LRP payload indication primitive is received before a corresponding beacon frame such that a receiver may receive the LRP payload indication primitive prior to the entire beacon frame and wherein the process for contending the current LRP channel is completed before the completion of processing of the beacon frame by a receiving station.

14. The method of claim 13, wherein the beacon length indication value represents the time length of the beacon frame belonging to a current superframe.

15. The method of claim 13, wherein the beacon length indication value represents the time length of the beacon frame belonging to a next superframe.

16. The method of claim 13, wherein the generating the beacon length indication value is performed by a media access control (MAC) layer of the transmitting station.

17. The method of claim 13, wherein the payload indication primitive is transmitted from a physical layer (PHY) receiving station (PHY-RX) to a medium access control (MAC) layer receiving station (MAC-RX).

18. A method of processing of beacon frames in a system for wireless communication of uncompressed video, the method comprising:
wirelessly receiving a beacon frame that includes a beacon length indication value representing the time length of a beacon frame by a receiving station, wherein the beacon length value is obtained from a medium access control protocol data unit (MPDU) length subfield of a long low-rate physical layer (LRP) header, wherein the beacon length indication value is placed in an LRP payload indication primitive; and
initiating and completing a process for contending a current low rate physical layer (LRP) channel using the beacon length indication value by the receiving station before the completion of processing of the beacon frame,
wherein the LRP payload indication primitive is received before a corresponding beacon frame such that the receiving station receives the LRP payload indication primitive prior to the entire beacon frame.

19. The method of claim 18 further comprising sending out a Channel Time Block (CTB) information request by the receiving station to a coordinator station within a first preset time if the receiving station does not receive part of the beacon frame that includes the beacon length indication value within a second preset time from a nominal beacon starting time.

20. The method of claim 18 further including parsing the beacon length indication value from the beacon frame.

21. The method of claim 20, wherein the parsing is performed by a physical (PHY) layer of the receiving station.

22. The method of claim 18, wherein the process for contending the current LRP channel is performed by a media access control (MAC) layer of the receiving station.

23. The method of claim 22, wherein the MAC layer receives the beacon length indication value and starts the process for contending the current LRP channel before the MAC layer completes processing of the beacon frame.

24. The method of claim 23, wherein the MAC layer contends the current LRP channel at Random Access Time Block (RATB) without waiting for the beacon process completion at the MAC layer.

25. A computer-usable non-transitory medium in a system for wireless communication of uncompressed video having computer readable code comprising instructions for:
processing and storing a beacon length indication value representing the time length of a beacon frame, wherein the beacon length indication value is added to a medium access control protocol data unit (MPDU) length subfield of a long low-rate physical layer (LRP) header, wherein the beacon length indication value is placed in an LRP payload indication primitive,
wherein the LRP payload indication primitive is received before a corresponding beacon frame such that a receiving station receives the LRP payload indication primitive prior to the entire beacon frame and wherein processing for contending the current LRP channel is completed before the completion of processing of the beacon frame by a receiving station.

* * * * *